(12) United States Patent
Jin et al.

(10) Patent No.: US 12,173,603 B2
(45) Date of Patent: Dec. 24, 2024

(54) LOW FREQUENCY DISTRIBUTED ACOUSTIC SENSING HYDRAULIC FRACTURE GEOMETRY

(71) Applicant: CONOCOPHILLIPS COMPANY, Houston, TX (US)

(72) Inventors: Ge Jin, Houston, TX (US); Baishali Roy, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 242 days.

(21) Appl. No.: 17/741,197

(22) Filed: May 10, 2022

(65) Prior Publication Data

US 2023/0003119 A1 Jan. 5, 2023

Related U.S. Application Data

(63) Continuation of application No. 16/163,115, filed on Oct. 17, 2018, now Pat. No. 11,352,878.
(Continued)

(51) Int. Cl.
*E21B 49/00* (2006.01)
*E21B 43/26* (2006.01)
(Continued)

(52) U.S. Cl.
CPC .............. *E21B 49/00* (2013.01); *E21B 43/26* (2013.01); *E21B 47/113* (2020.05); *G01V 1/42* (2013.01);
(Continued)

(58) Field of Classification Search
CPC ......... E21B 43/26; E21B 49/00; G01V 1/226; G01V 2210/646
See application file for complete search history.

(56) References Cited

U.S. PATENT DOCUMENTS 3,981,187 A 9/1976 Howell
4,676,664 A 6/1987 Anderson et al.
(Continued)

FOREIGN PATENT DOCUMENTS

GB 2492802 A 1/2013
WO 2001048353 A1 7/2001
(Continued)

OTHER PUBLICATIONS

Li, Z., & Zhan, Z. (2018). Pushing the limit of earthquake detection with distributed acoustic sensing and template matching: A case study at the Brady geothermal field. Geophysical Journal International, 215(3), 1583-1593. (Year: 2018).*
(Continued)

*Primary Examiner* — Bijan Mapar
(74) *Attorney, Agent, or Firm* — CONOCOPHILLIPS COMPANY

(57) ABSTRACT

Monitoring and diagnosing completion during hydraulic fracturing operations provides insights into the fracture geometry, inter-well frac hits and connectivity. Conventional monitoring methods (microseismic, borehole gauges, tracers, etc.) can provide a range of information about the stimulated rock volume but may often be limited in detail or clouded by uncertainty. Utilization of DAS as a fracture monitoring tool is growing, however most of the applications have been limited to acoustic frequency bands of the DAS recorded signal. In this paper, we demonstrate some examples of using the low-frequency band of Distributed Acoustic Sensing (DAS) signal to constrain hydraulic fracture geometry. DAS data were acquired in both offset horizontal and vertical monitor wells. In horizontal wells, DAS data records formation strain perturbation due to fracture propagation. Events like fracture opening and closing, stress shadow creation and relaxation, ball seat and plug
(Continued)

isolation can be clearly identified. In vertical wells, DAS response agrees well with co-located pressure and temperature gauges, and illuminates the vertical extent of hydraulic fractures. DAS data in the low-frequency band is a powerful attribute to monitor small strain and temperature perturbation in or near the monitor wells. With different fibered monitor well design, the far-field fracture length, height, width, and density can be accurately measured using crosswell DAS observations.

18 Claims, 8 Drawing Sheets

Related U.S. Application Data

(60) Provisional application No. 62/573,486, filed on Oct. 17, 2017.

(51) Int. Cl.
  *E21B 47/113* (2012.01)
  *G01V 1/20* (2006.01)
  *G01V 1/22* (2006.01)
  *G01V 1/42* (2006.01)

(52) U.S. Cl.
  CPC .............. *G01V 1/208* (2013.01); *G01V 1/226* (2013.01); *G01V 2210/1234* (2013.01); *G01V 2210/1429* (2013.01); *G01V 2210/163* (2013.01); *G01V 2210/646* (2013.01)

(56) References Cited

U.S. PATENT DOCUMENTS

| | | | |
|---|---|---|---|
| 6,026,913 A | 2/2000 | Mandal et al. | |
| 6,176,323 B1 | 1/2001 | Weirich et al. | |
| 6,268,911 B1 | 7/2001 | Tubel et al. | |
| 6,778,720 B1 | 8/2004 | Cekroich et al. | |
| 7,055,604 B2 | 6/2006 | Jee et al. | |
| 7,668,411 B2 | 2/2010 | Davies et al. | |
| 8,505,625 B2 | 8/2013 | Ravi et al. | |
| 8,630,816 B2 | 1/2014 | Park et al. | |
| 8,646,968 B2 | 2/2014 | MacDougall et al. | |
| 8,930,143 B2 | 1/2015 | Sierra et al. | |
| 8,950,482 B2 | 2/2015 | Hill et al. | |
| 9,116,119 B2 | 8/2015 | Le Floch | |
| 9,273,548 B2 | 3/2016 | LeBlanc et al. | |
| 9,347,310 B2 | 5/2016 | Unalmis et al. | |
| 9,416,644 B2 | 8/2016 | McEwen-King et al. | |
| 9,464,512 B2 | 10/2016 | Kalia et al. | |
| 10,095,828 B2 | 10/2018 | Swan et al. | |
| 2002/0180728 A1 | 12/2002 | Neff et al. | |
| 2003/0205375 A1 | 11/2003 | Wright et al. | |
| 2006/0272809 A1 | 12/2006 | Tubel et al. | |
| 2008/0277568 A1 | 11/2008 | Crickmore et al. | |
| 2009/0114386 A1 | 5/2009 | Hartog et al. | |
| 2009/0194333 A1 | 8/2009 | MacDonald | |
| 2009/0274005 A1* | 11/2009 | Hansteen | G01V 1/30 367/21 |
| 2009/0326826 A1 | 12/2009 | Hull et al. | |
| 2010/0076738 A1 | 3/2010 | Dean et al. | |
| 2010/0200743 A1 | 8/2010 | Forster et al. | |
| 2010/0200743 A1 | 8/2010 | Pearce et al. | |
| 2010/0284250 A1 | 11/2010 | Cornish et al. | |
| 2011/0019178 A1 | 1/2011 | Vlatas | |
| 2011/0188347 A1 | 8/2011 | Thiercelin et al. | |
| 2011/0288843 A1 | 11/2011 | Weng et al. | |
| 2012/0017687 A1 | 1/2012 | Davis et al. | |
| 2012/0057432 A1 | 3/2012 | Hill et al. | |
| 2012/0067118 A1 | 3/2012 | Hartog et al. | |
| 2012/0092960 A1 | 4/2012 | Gaston et al. | |
| 2012/0111560 A1 | 5/2012 | Hill et al. | |
| 2012/0133367 A1 | 5/2012 | Bittar et al. | |
| 2012/0147924 A1 | 6/2012 | Hall | |
| 2013/0023353 A1 | 1/2013 | Wright | |
| 2013/0032338 A1 | 2/2013 | Kalia et al. | |
| 2013/0211726 A1 | 8/2013 | Mestayer et al. | |
| 2013/0233537 A1 | 9/2013 | McEwen-King et al. | |
| 2013/0298635 A1 | 11/2013 | Godfrey | |
| 2013/0298665 A1 | 11/2013 | Minchau | |
| 2014/0036628 A1 | 2/2014 | Hill et al. | |
| 2014/0100274 A1 | 4/2014 | Bobotas et al. | |
| 2014/0110124 A1 | 4/2014 | Goldner et al. | |
| 2014/0126325 A1 | 5/2014 | Farhadiroushan et al. | |
| 2014/0163889 A1 | 6/2014 | Finfer et al. | |
| 2014/0180592 A1 | 6/2014 | Ravi et al. | |
| 2014/0202240 A1 | 7/2014 | Skinner et al. | |
| 2014/0216151 A1 | 8/2014 | Godfrey | |
| 2014/0246191 A1 | 9/2014 | Zolezzi-Garreton | |
| 2014/0260588 A1 | 9/2014 | Jaaskelainen et al. | |
| 2014/0290936 A1 | 10/2014 | Wills et al. | |
| 2014/0358444 A1 | 12/2014 | Friehauf et al. | |
| 2014/0365130 A1 | 12/2014 | Woods | |
| 2015/0000932 A1 | 1/2015 | O'Brien | |
| 2015/0014521 A1 | 1/2015 | Barfoot | |
| 2015/0057934 A1 | 2/2015 | Ma et al. | |
| 2015/0083405 A1 | 3/2015 | Dobroskok et al. | |
| 2015/0135819 A1 | 5/2015 | Petrella et al. | |
| 2015/0146759 A1 | 5/2015 | Johnston | |
| 2015/0159478 A1 | 6/2015 | Georgi et al. | |
| 2015/0331971 A1 | 11/2015 | Scollard et al. | |
| 2016/0003032 A1 | 1/2016 | Grubb et al. | |
| 2016/0108705 A1 | 4/2016 | Maxwell et al. | |
| 2016/0138389 A1 | 5/2016 | Stokely | |
| 2016/0146962 A1 | 5/2016 | Hayward | |
| 2016/0265345 A1 | 9/2016 | In't Panhuis et al. | |
| 2016/0266276 A1 | 9/2016 | Stokely et al. | |
| 2016/0319661 A1* | 11/2016 | Mayerhofer | E21B 49/006 |
| 2016/0356125 A1 | 12/2016 | Bello et al. | |
| 2017/0045410 A1 | 2/2017 | Crickmore et al. | |
| 2017/0075005 A1 | 3/2017 | Ranjan et al. | |
| 2017/0075006 A1 | 3/2017 | Dusterhoft et al. | |
| 2017/0123089 A1* | 5/2017 | Walters | E21B 43/26 |
| 2017/0191363 A1 | 7/2017 | Dickenson | |
| 2017/0205260 A1 | 7/2017 | Jaaskelainen et al. | |
| 2017/0260839 A1 | 9/2017 | Beardmore et al. | |
| 2017/0260842 A1 | 9/2017 | Jin et al. | |
| 2017/0260846 A1 | 9/2017 | Jin et al. | |
| 2017/0260849 A1 | 9/2017 | Jin et al. | |
| 2017/0260854 A1 | 9/2017 | Jin et al. | |
| 2017/0328181 A1 | 11/2017 | Kristjansson et al. | |
| 2017/0342814 A1 | 11/2017 | Krueger et al. | |
| 2018/0016890 A1 | 1/2018 | Friehauf | |
| 2018/0217285 A1 | 8/2018 | Walters et al. | |
| 2018/0230049 A1 | 8/2018 | Wysocki et al. | |
| 2018/0348389 A1 | 12/2018 | Jaaskelainen et al. | |

FOREIGN PATENT DOCUMENTS

| | | |
|---|---|---|
| WO | 2013092906 A2 | 6/2013 |
| WO | 2015067931 A2 | 11/2014 |
| WO | 2014201316 A1 | 12/2014 |
| WO | 2015065869 A1 | 5/2015 |
| WO | 2015076976 A1 | 5/2015 |
| WO | 2015094180 A1 | 6/2015 |
| WO | 2015107332 A1 | 7/2015 |
| WO | 2015170113 A1 | 11/2015 |
| WO | 2015187140 A1 | 12/2015 |
| WO | 2015187149 A1 | 12/2015 |
| WO | 2016007161 A1 | 1/2016 |
| WO | 201069322 A1 | 5/2016 |
| WO | 2017027340 A1 | 2/2017 |
| WO | 2017039605 A1 | 3/2017 |
| WO | 2017156331 A1 | 9/2017 |
| WO | 2017156339 A1 | 9/2017 |
| WO | 2018204920 A1 | 11/2018 |

OTHER PUBLICATIONS

Bakku, S. K., Fehler, M., Wills, P., Mestayer, J., Mateeva, A., & Lopez, J. (2014). Vertical seismic profiling using distributed acous-

(56) References Cited

OTHER PUBLICATIONS tic sensing in a hydrofrac treatment well. In SEG Technical Program Expanded Abstracts 2014 (pp. 5024-5028). Society of Exploration Geophysicists. (Year: 2014).*
Zeng, X., Lancelle, C., Thurber, C., Fratta, D., Wang, H., Lord, N., . . . & Clarke, A. (2017). Properties of noise cross-correlation functions obtained from a distributed acoustic sensing array at Garner Valley, California. Bulletin of the Seismological Society of America, 107(2), 603-610. (Year: 2017).*
Wilks, M., Wuestefeld, A., Oye, V., Thomas, P., & Kolltveit, E. (2017). Tailoring distributed acoustic sensing techniques for the microseismic monitoring of future CCS sites: Results from the field. In SEG Technical Program Expanded Abstracts 2017 (pp. 2762-2766). Society of Exploration Geophysicists. (Year: 2017).*
Dawson, Matthew, et al—"Breakthrough in Hydraulic Fracture & Proppant Mapping: Achieving Increased Precision with Lower Cost", 2016, Unconventional Resources Technology Conference, URTec: 2432330; 21 pgs.
Grechka, V.—"Penny-shaped Fractures Revisited", 2005, Stud. Geophys. Geod. 49, pp. 365-381; 17 pgs.
Hausveit, K., et al—"New Age Fracture Mapping Diagnostic Tools—A STACK Case Study", 2017, Society of Petroleum Engineers, SPE-184862-MS; 14 pgs.
Fisher, M.K., et al—"Optimising Horizontal Completion Techniques in the Barnett Shale Using Microseismic Fracture Mapping", 2004, SPE 90051, SPE International; 11 pgs.
Sellwood, S.M., et al—"An in-well heat-tracer-test method for evaluating borehole flow conditions", Hydrogeology Journal, Springer, vol. 23, No. 8, pp. 1817-1830 (Aug. 20, 2015).
Webster, P., et al—"Micro-seismic Detection using distributed acoustic sensing", Society of Exploration Geophysicists, 5 pgs (Aug. 19, 2013).
Webster, P., et al—"Developments in Diagnostic Tools for Hydraulic Fracture Geometry Analysis", Unconventional Resources Technology Conference, 7 pgs (Aug. 12-14, 2013).
Wheaton, B., et al—"A case study of completion effectiveness in the Eagle Ford Shale using DAS/DTS observations and hydraulic modeling", Society of Petroleum Engineers, 11 pgs (2016).
Wu, K., et al—"Mechanism analysis of well interference in unconventional reservoirs: Insights from fracture-geometry simulation between two horizontal wells", Society of Petroleum Engineers, vol. 33, No. 1, 9 pgs (Feb. 2018).
Awada, A., et al. "Is that interference? A work flow for identifying and analyzing communication through hydraulic fractures in a multiwell pad," SPE Journal, vol. 21, No. 5, pp. 13 (Oct. 2016).
Becker, M.B., et al., "Measuring Hydralic Connection in Fractured Bedrock with Periodic Hydraulic Tests and Distributed Acoustic Sensing," Juounal of Hydrology, pp. 1-11 (Feb. 22-24, 2016).
Boman, K., "DAS technology expands fiber optic applications for oil, gas industry," Rigzone, (May 4, 2015) issue : http://www.rigzone.com/news/oil_gas/a/138405/DAS_Technology_Expands_Fiber_Optic_Applications_for_Oil_Gas_Industry, pp. 4.
Boone, K., et al., "Monitoring Hydraulic Fracturing Operations Using Fiber-Optic Distributed Acoustic Sensing," Unconventional Resources Technology Conference, pp. 8 (2015).
European Search Report for European Application No. EP 17764137.0 mailed on Mar. 6, 2019.
European Search Report for European Application No. EP 17764143.8 mailed on Mar. 4, 2019.
European Search Report for European Application No. EP 17764150.3 mailed on Mar. 4, 2019.
European Search Report for European Application No. EP 17764151.1 mailed on Mar. 4, 2019.
European Search Report for European Application No. EP17764146.1 mailed on Mar. 14, 2019.
Grayson, S., et al., "Monitoring acid stimulation treatments in naturally fractured reservoirs with slickline distributed temperature sensing," Society of Petroleum Engineers, pp. 17, (Jan. 2015).

International Search Report with Written Opinion for International Application No. PCT/US2017/021659 mailed on Jun. 1, 2017, pp. 7.
International Search Report with written opinion dated Jun. 1, 2017 for International Application No. PCT/US2017/021667, pp. 8.
International Search Report with Written Opinion for International Application No. PCT/US2017/021674 mailed on May 25, 2017, pp. 10.
International Search Report with Written Opinion for International Application No. PCT/US2017/021678 mailed on Jun. 1, 2017, pp. 7.
International Search Report with Written Opinion for International Application No. PCT/US2017/021679 mailed on May 25, 2017, pp. 7.
International Search Report with Written Opinion for International Application No. PCT/US2017/021681 mailed on May 22, 2017, pp. 10.
International Search Report with Written Opinion for International Application No. PCT/US2017/21670 mailed on May 25, 2017, pp. 6.
International Search Report with Written Opinion for International Application No. PCT/US2018/031404 mailed on Jul. 13, 2018, pp. 15.
International Search Report with Written Opinion for International Application No. PCT/US2018/056327 mailed on Dec. 21, 2018, pp. 12.
International Search Report with Written Opinion for International Application No. PCT/US2019/030408 mailed on Jul. 22, 2019, pp. 9.
Jin, G., and Roy, B., "Hydraulic-fracture geometry characterization using low-frequency DAS signal," The Leading Edge, vol. 36, No. 12, pp. 962-1044 (Dec. 2017).
Johannessen, K., et al. "Distributed Acoustic Sensing—a new way of listening to your well/reservoir," Society of Petroleum Engineers, Society of Petroleum Engineers, pp. 1-9 (Mar. 27-29, 2012).
Le Calvez, J. H., et al. "Real-time microseismic monitoring of hydraulic fracture treatment: a tool to improve completion and reservoir management," Society of Petroleum Engineers, pp. 7 (Jan. 2007).
Lord, D.L., "Study of Performation Friction Pressure Employing a Loarge-Scale Fracturing Flow Simulator," SPE Annual technical Conference and Exhibition, pp. 10 (Sep. 25, 1994).
McKinley, R.M., et al., "Specialized Applications of Noise Logging," Journal of Petroleum Technology, vol. 31, Issue 11, pp. 1387-1395 (Nov. 1979).
McKinley, R.M., et al., "The Structure and Interpretation of Noise From Flow Behind Cemented Casing," Journal of Petroleum Technology, vol. 25, No. 3, pp. 329-338 (Mar. 1973).
Molenaar, M., et al., "First Downhole Application of Distributed Acoustic Sensing (DAS) for Hydraulic Fracturing Monitoring and Diagnostics," Society of Petroleum Engineers, vol. 27, No. 1, pp. 32-38 (Mar. 2012).
Molenaar, M.M., et al., "Real-Time Downhole Monitoring of Hydraulic Fracturing Treatments Using Fibre Optic Distributed Temperature and Acoustic Sensing," Society of Petroleum Engineers, pp. 13 (2012).
European Search Report for European Application No. EP18794756.9 mailed on Apr. 14, 2020.
Bukhamsin, A., et al., Cointerpretation of distributed acoustic and temperature sensing for improved smart well inflowprofilling. In SPE 180465-MS, Western Regional Meeting. Society of Petroleum Engineers (2016).
Byrd, R. H., et al., A limited memory algorithm for bound constrained optimization. SIAM Journal on Scientific Computing, 16 (5), 1190-1208 (1995).
Curtis, M., et al. (1973). Use of the temperature log for determining flow rates in producing wells. In Fall Meeting of theSociety of Petroleum Engineers of AIME. Society of Petroleum Engineers 4637 (1973).
Dakin, J., Distributed optical fibre Raman temperature sensor using a semiconductor light source and detector.Electronics letters, 21 (13), 569-570 (1985).

(56) References Cited

OTHER PUBLICATIONS

Ouyang, L.-B., Flow profiling by distributed temperature sensor (DTS) system-expectation and reality. SPE Production& Operations, 21 (02), 269-281 (2006).
Ramey Jr, H., et al., Wellbore heat transmission. Journal of Petroleum Technology, 14 (04), 427-435 (1962).
Van der Horst, et al., Fiber optic sensing for improved wellbore production surveillance. In IPTC 2014: International Petroleum Technology Conference (2014).
Vu-Hoang, D., et al., A novel approach to production logging in multiphase horizontal wells. In SPE 89848, Annual Technical Conference and Exhibition. Society of Petroleum Engineers (2004).
Rector, J.W., et al—"The Use of an Active Drill Bit for Inverse VSP Measurements", 2018, Exploration Geophysics, vol. 20, Issue 1-2, Abstract only, 5 pgs.
URTEC-2670034-MS (2017) Raterman K.Y., et al., Sampling a Stimulated Rock Volume: An Eagle Ford Example.
SPE-168610-MS (2014)—Holley, E.H., et al. "Using Distributed Optical Sensing to Constrain Fracture Models and Confirm Reservoir Coverage in Permian Basin." SPE Hydraulic Fracturing Technology Conference, The Woodlands, Texas, U.S.A., Feb. 4-6.
SPE-153131-PA (2013)—Holley, E.H., et al., "Interpreting Uncemented Multistage Hydraulic-Fracturing Completion Effectiveness By Use of Fiber-Optic DTS Injection Data."SPE Drilling & Completion, 28(3): 243-253.
SPE-107775-PA (2009)—Glasbergen G., et al. "Real-Time Fluid Distribution Determination in Matrix Treatments Using DTS", Society of Petroleum Engineers.
SPE-116182-MS (2008}—Sierra J.R., et al., "DTS Monitoring of Hydraulic Fracturing: Experiences and Lessons Learned", Society of Petroleum Engineers.
SPE-107854-MS (2007}—Tardy, et al., "An Experimentally Validated Wormhole Model for Self-Diverting and:onventional Acids in Carbonate Rocks Under Radial Flow Conditions", Society of Petroleum Engineers.
Ribeiro et al., Detecting Fracture Growth Out of Zone Using Temperature Analysis, Oct. 27-29, 2014, SPE-170746-MS, SPE Annual Technical Conference and Exhibition, Amsterdam, The Netherlands, 24 pp. (Year: 2014).
Hesthammer, J et al. "From seismic data to core data: an integrated approach to enhance reservoir characterization"; 2003; Geological Society, London, Special Publications, 209, pp. 39-54.
Optasense, "Pipeline Integrity Management: Leak Detection," accessed at https://ace-control.com.sg/wp-content/uploads/2018/11/Pipeline-Integrity-Management-Leak-Detection.pdf, accessed on Jun. 10, 2019, pp. 5.
Ouyang, L-B., et al. "Flow profiling via distributed temperature sensor (DTS) system-expectation and reality," Society of Petroleum Engineers, pp. 14 (2004).
Paleja, R, et al., "Velocity Tracking for Flow Monitoring and Production Profiling Using Distributed Acoustic Sensing," Society of Petroleum Engineers, pp. 16 (Sep. 28-30, 2015).
Portis, D. H., et al., "Searching for the optimal well spacing in the eagle ford shale: A practical tool-kit," Unconventional Resources Technology Conference, pp. 8 (Aug. 12-14, 2013).

* cited by examiner

Intensity Waterfall

Processed Low-frequency DAS

LOW FREQUENCY DISTRIBUTED ACOUSTIC SENSING HYDRAULIC FRACTURE GEOMETRY

PRIOR RELATED APPLICATIONS

This application is a continuation application which claims benefit under 35 USC § 120 to U.S. application Ser. No. 16/163,115 filed Oct. 17, 2018, entitled "LOW FREQUENCY DISTRIBUTED ACOUSTIC SENSING HYDRAULIC FRACTURE GEOMETRY," which claims benefit under 35 USC § 119(e) to U.S. Provisional Application Ser. No. 62/573,486 filed Oct. 17, 2017, entitled "LOW FREQUENCY DISTRIBUTED ACOUSTIC SENSING HYDRAULIC FRACTURE GEOMETRY," both of which are incorporated herein in their entirety.

FEDERALLY SPONSORED RESEARCH STATEMENT

Not applicable.

REFERENCE TO MICROFICHE APPENDIX

Not applicable.

FIELD OF THE DISCLOSURE

The disclosure relates generally to hydraulic fracturing. In particular, a data acquisition program using core, image log, microseismic, Distributed Temperature Sensing (DTS), Distributed Acoustic Sensing (DAS), and pressure data is used to monitor stimulation operations.

BACKGROUND OF THE DISCLOSURE

Unconventional reservoirs include reservoirs such as tight-gas sands, gas and oil shales, coalbed methane, heavy oil and tar sands, and gas-hydrate deposits. These reservoirs have little to no porosity, thus the hydrocarbons may be trapped within fractures and pore spaces of the formation. Additionally, the hydrocarbons may be adsorbed onto organic material of a e.g. shale formation. Therefore, such reservoirs require special recovery operations outside the conventional operating practices in order to mobilize and produce the oil.

The rapid development of extracting hydrocarbons from these unconventional reservoirs can be tied to the combination of horizontal drilling and induced fracturing (called "hydraulic fracturing" or simply "fracking") of the formations. Horizontal drilling has allowed for drilling along and within hydrocarbon reservoirs of a formation to better capture the hydrocarbons trapped within the reservoirs. Additionally, increasing the number of fractures in the formation and/or increasing the size of existing fractures through fracking increases hydrocarbon recovery.

In a typical hydraulic fracturing treatment, fracturing treatment fluid is pumped downhole into the formation at a pressure sufficiently high enough to cause new fractures or to enlarge existing fractures in the reservoir. Next, frack fluid plus a proppant, such as sand, is pumped downhole. The proppant material remains in the fracture after the treatment is completed, where it serves to hold the fracture open, thereby enhancing the ability of fluids to migrate from the formation to the well bore through the fracture. The spacing between fractures as well as the ability to stimulate fractures naturally present in the rock may be major factors in the success of horizontal completions in unconventional hydrocarbon reservoirs.

While there are a great many fracking techniques, one useful technique is "plug-and-perf" fracking. Plug-and-perf completions are extremely flexible multistage well completion techniques for cased hole wells. Each stage can be perforated and treated optimally because the fracture plan options can be modified in each stage. The engineer can apply knowledge from each previous stage to optimize treatment of the current frack stage.

The process consists of pumping a plug-and-perforating gun to a given depth. The plug is set, the zone perforated, and the tools removed from the well. A ball is pumped downhole to isolate the zones below the plug and the fracture stimulation treatment is then pumped in, although washing, etching, and other treatments may occur first depending on downhole conditions. The ball-activated plug diverts fracture fluids through the perforations into the formation. After the fracture stage is completed, the next plug and set of perforations are initiated, and the process is repeated moving further up the well.

Improvements in recovery using fracking depend on fracture trajectories, net pressures, and spacing. Thus, the ability to monitor the geometry of the induced fractures to obtain optimal placement and stimulation is paramount. An induced fracture may be divided into three different regions (hydraulic, propped, and effective), but out of the three fracture dimensions, only the last one is relevant to a reservoir model, and may be used to forecast future production.

Many techniques have been developed to map hydraulic fractures, including microseismic monitoring (Fisher et al. 2004), electromagnetic imaging (Haustveit et al. 2017), seismic time lapse (Atkinson and Davis 2011), pressure monitoring in offset wells (Dawson and Kampfer 2016), fluid and proppant tracers, and others. All these methods have their own strengths and limitations.

Distributed Acoustic Sensing (DAS) is an emerging fiber optic based technology that has become available for the oil industry only in recent years. The method requires an optical fiber attached to the wellbore to guide the laser energy into the reservoir. Each piece of the fiber naturally scatters a small portion of the laser energy back to the surface sensing unit. The sensing unit then uses interferometry techniques to measure the strain change along the fiber. The DAS data are usually sampled at a very high rate (5000-10000 Hz) with a spatial resolution between 1-10 m. This high position accuracy provides critical spatial data for detecting near well bore changes both in the well undergoing stimulation and in an offset monitor well.

The raw DAS data are usually delivered in the form of optical phase, which ranges from $-\pi$ to $+\pi$. The optical phase is defined by the interference pattern of the laser energy back-scattered at two fiber locations separated by a certain length. The separation length is usually referred as gauge length. The phase varies linearly with small length change between two locations, which can be approximated as the axial strain change of the fiber between the locations. Depending on the sensing unit provider, the data deliverable is sometimes a time differential of the measured optical phase. In this case, the DAS data can be treated as a linear-scaled strain rate.

DAS data have been used to monitor hydraulic fracturing operations in many studies. The applications include injection fluid allocation (Boone et al. 2015), hydraulic fracture detection (Webster, Cox, and Molenaar 2013), microseismic monitoring (Webster et al. 2013), and others. However, most of these applications focus on the high frequency bands (>1 Hz) of the DAS data, and some applications only use the "intensity" of the signal, which is obtained through amplitude averaging processing. In this study, we demonstrate that DAS data in the low-frequency band (<0.05 Hz) contain information that can provide critical constrains on hydraulic fracture geometry.

Thus, what is needed in the art are improved methods of evaluating the hydraulic fracturing for every well being hydraulically stimulated. Optimizing completions parameters are critical to improving hydraulic fracturing efficiency and unconventional production performance. Monitoring and diagnosing any potential completion issues during the stimulation operation is important to find the factors that affect well production. Therefore, understanding the geometry of hydraulic fractures is critical for designing unconventional reservoir completions. The length and height of fractures influence the optimization of well spacing and job size (e.g., injection volume), the width is important parameter for proppant transportation and fracture permeability, and the density can be used to optimize cluster spacing. All these completion parameters contribute towards reduced cost-of-supply and improved efficiency for unconventional reservoir development.

Although hydraulic fracturing is quite successful, even incremental improvements in technology can mean the difference between cost effective production and reserves that are uneconomical to produce.

SUMMARY OF THE DISCLOSURE

A new method that utilizes the fiber optic sensing technology to detect and characterize hydraulic fractures is described.

A method of determining strain response in a hydrocarbon-containing reservoir where an operation well and a monitor well with a distributed acoustic sensing (DAS) fiber are used to monitor a DAS signal while fracturing the operation well in a fracture stimulation to form a set of fractures; determining the far-field fracture length, height, width and density of said fractures.

A method of recovering hydrocarbons from a hydrocarbon-containing reservoir comprising: drilling at least one operation well; drilling at least one monitor well; installing a distributed acoustic sensing (DAS) fiber in said monitor well; obtaining DAS data from said monitor while fracturing at least one operation well to form a set of fractures; characterizing the far-field fracture length, height, width and density of said fractures; updating said pre-determined fracturing parameters based on said characterizing step; and, performing a second fracturing stimulation stage; and, producing hydrocarbons.

A computer-implemented method for modeling the stimulated reservoir volume (SRV) of a hydrocarbon-containing reservoir, the method comprising: drilling at least one operation well into an area of said reservoir to be stimulated; drilling at least one monitoring well in said reservoir; installing at least one distributed acoustic sensing (DAS) fiber in at least one monitoring well; obtaining DAS data while fracturing at least one operation well in a first fracture stimulation stage according to pre-determine fracturing parameters to form a set of fractures; identifying said set of fractures formed in said fracturing step; and, characterizing the complexity, length, branching, or density of said fractures.

The monitor well may be a horizontal well or a vertical well. The monitor well can collect data from one or more adjacent operation wells. The data can be used to characterize and model the stress shadow, displacement, fracture propagation velocity, or a combination features. This process may be used to modify the fracturing for subsequent stages and may be repeated for multiple fractures in the hydrocarbon reservoir.

DAS is the measure of Rayleigh scatter distributed along the fiber optic cable. In use, a coherent laser pulse from an interrogator is sent along the optic fiber and scattering sites within the fiber itself causes the fiber to act as a distributed interferometer with a pre-set gauge length. Thus, interactions between the light and material of the fiber can cause a small amount of light to backscatter and return to the input end, where it is detected and analyzed. Acoustic waves, when interacting with the materials that comprise the optical fiber, create small changes in the refractive index of the fiber optic cable. These changes affect the backscatter characteristics, thus becoming detectable events. Using time-domain techniques, event location is precisely determined, providing fully distributed sensing with resolution of 1 meter or less.

Applicant has previously used DAS in a variety of fracturing monitoring methods described in detail in the following U.S. patents: U.S. Pat. Nos. 10,287,874, 10,370,957, 10,890,058, 10,458,228, 10,095,828; 10,465,501; and 10,808,521; all of which are incorporated herein for all purposes.

The programs and methods described utilize non-transitory machine-readable storage medium, which when executed by at least one processor of a computer, performs the steps of the method(s) described herein.

Due to the nature of the data pre- and post-transform, parallel computing and data storage infrastructure created for data intensive projects, like seismic data processing, are used because they can easily handle the complete dataset. Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system. Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Alternatively, many-cores can be used in the computing. A Linux based multi-core cluster has been used to process the data in the examples described herein.

The disclosed methods include any one or more of the below embodiments in any combination(s) thereof:

Any method described herein, including the further step of printing, displaying or saving the initial, intermediate or final (or both) datasets of the method to a non-transitory computer readable memory.

Any method described herein, further including the step of using the final datasets in a reservoir modeling program to predict reservoir performance characteristics, such as fracturing, production rates, total production levels, rock failures, faults, wellbore failure, and the like.

Any method described herein, further including the step of using said final datasets to design, implement, or update a hydraulic fracturing program in a similar reservoir, in a similar producer well, or in subsequent fracturing stages of said reservoir.

Any method described herein, further including the step of producing hydrocarbon by said reservoir.

This summary is provided to introduce a selection of concepts that are further described below in the detailed description. This summary is not intended to identify key or essential features of the claimed subject matter, nor is it intended to be used as an aid in limiting the scope of the claimed subject matter.

"Fracking", as used herein, may refer to any human process used to initiate and propagate a fracture in a rock formation, but excludes natural processes that fracture formation, such as natural seismic events. The fracture may be an existing fracture in the formation, or may be initiated using a variety of techniques known in the art. "Hydraulic Frocking" means that pressure was applied via a fluid.

As used herein, "fracture parameters" refers to characteristics of fractures made using hydraulic fracking and includes fracture growth, fracture height, fracture geometry, isolation conditions between stages, stress shadows and relaxation, fracture spacing, perforation cluster spacing, number of perforation clusters/stage, well spacing, job size, pumping pressure, heel pressure, proppant concentration, fluid and proppant distribution between perforation clusters, pumping volume, pumping rate and the like.

As used herein, a "fracture model" refers to a software program that inputs well, rock and fracturing parameters and simulates fracturing results in a model reservoir. Several such packages are available in the art, including SCHLUMBERGERS® PETREL® E&P,FRACCADE® or MANGROVE® software, STIMPLAN™, tNAVIGATOR™, SEEMYFRAC™, TERRAFRAC™, ENERFRAC®, PROP®, FRACPRO™, and the like. Add GOHFER® (Barree & Associates LLC) For shale reservoirs, FRACMAN™ and MSHALE™ may be preferred. These models can be used with appropriate plugins or modifications needed to practice the claimed methods.

By "fracture pattern", we refer to the order in which the frack zones are fractured.

The term "fracture complexity" refers to the degree of entanglement (or lack thereof) in the induced fractures. Fractures can range from simple planar fractures to complex planar fractures and network fracture behavior. Further, the fracture complexity can change from near-well, mid-field, and far-field regions.

As used herein, the "Gaussian Kernel" or "radial basis function kernel" aka "RBF kernel" is a popular kernel function used in various kernelized learning algorithms. In particular, it is commonly used in support vector machine classification.

As used herein, a "monitoring" well is a well nearby a producer that is used to monitor a producer. It produces samples and data for control purposes.

The term "many-core" as used herein denotes a computer architectural design whose cores include CPUs and GPUs. Generally, the term "cores" has been applied to measure how many CPUs are on a giving computer chip. However, graphic cores are now being used to offset the work of CPUs. Essentially, many-core processors use both computer and graphic processing units as cores.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| SRV | simulated rock volume |
| DAS | Distributed Acoustic Sensing |
| G | gauges |
| bbl | oil barrel |
| P | producer well |
| S | data well |
| CT | Computer tomography |
| TVD | True vertical depth |
| NE | Northeast |
| SW | Southwest |

BRIEF DESCRIPTION OF DRAWINGS

The file of this patent contains at least one drawing executed in color. Copies of this patent with color drawing(s) will be provided by the Office upon request and payment of the necessary fee.

DETAILED DESCRIPTION

The invention provides a novel data acquisition program or method for monitoring hydraulic fracturing and sampling stimulation rock volume (SRV).

Data Acquisition

Because DAS is a strain rate sensor and the fiber is mechanically coupled with the formation, strain from the process of hydraulic fracturing can be detected. The DAS data of two example stages shown in this study are recorded at an offset monitor well during stimulation of an adjacent well. The fiber-optic cables are installed outside the casing and cemented in place. The raw data are sampled at 10 kHz continuously at more than 6000 locations along the wellbore, with 1 m spatial sampling and 5 m gauge length. The recorded optical phase is differentiated in time, hence the DAS data are linearly correlated with the strain rate along the fiber.

Data Processing

Figure 1A:
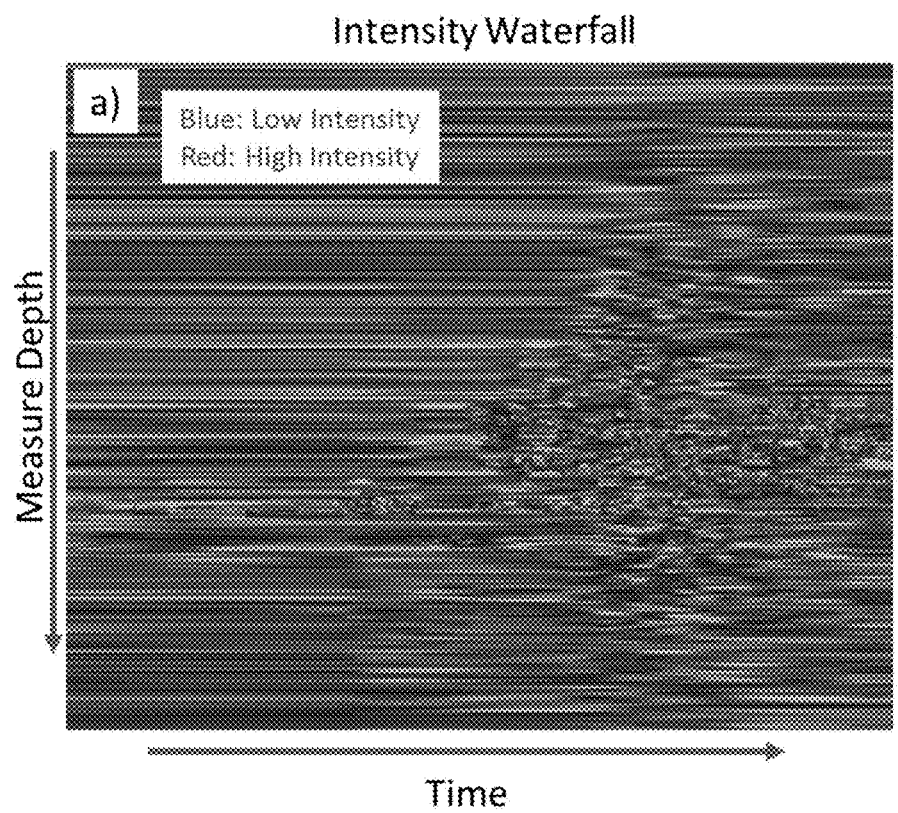
FIG. 1A) is a standard industry waterfall visualization.
Figure 1B:
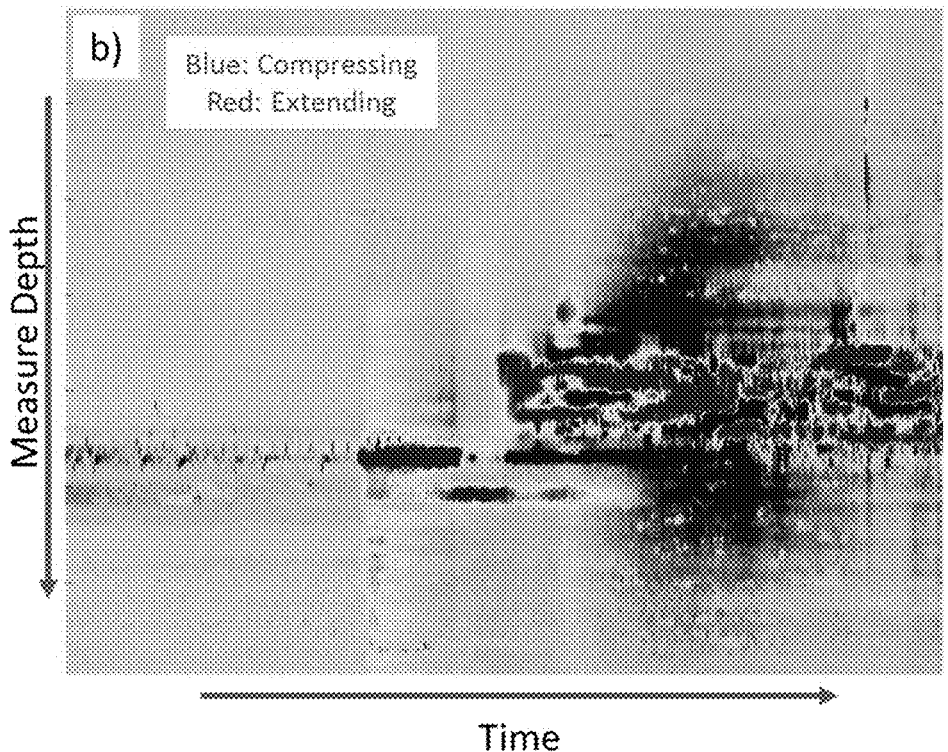
FIG. 1B) is a processed low frequency DAS signal.

The raw DAS data are down-sampled to 1 s after a low-pass anti-aliasing filter (0-0.5 Hz) is applied. The data are then median filtered to remove any spiky noise. Another low-pass filter with a corner frequency of 0.05 Hz is then applied. A DC drift with an amplitude around 0.1 rad/s is removed from the data as well. The DC drift was channel invariant and does not vary significantly with time. The drift noise is most likely associated with interrogator noise. We estimate the DC drift by calculating the median value of the channels that are out of the zone of interest at each time interval. Compared to the industry standard waterfall visualizations, the low-frequency processing not only increases the signal-to-noise ratio of the signal, but also preserves the strain rate polarity (FIG. 1) which is important for our interpretations. The strain change recorded by DAS at this frequency band can be caused by thermal variation and/or mechanic strain perturbation.

Hydraulic Fracture Monitoring

Horizontal Well Measurement

The propagation of hydraulic fractures is associated with strain perturbation in the surrounding formation. For a simple planar fracture model, the stress component in the direction perpendicular to the fracture plane can be characterized by two zones: the extensional zone in front of fracture tip, and the compressional stress shadow on both sides of the fracture (Grechka 2005).

Cementation of the fiber in place outside the casing in a horizontal offset well makes it well-suited for measurement of the strain induced by fracture propagation since the fiber is mechanically coupled with the surrounding formation. The monitor well is also usually parallel to the operation well, which is typically at a high angle to the fracture plane, thereby maximizing the strain response along the fiber.

Figure 2:
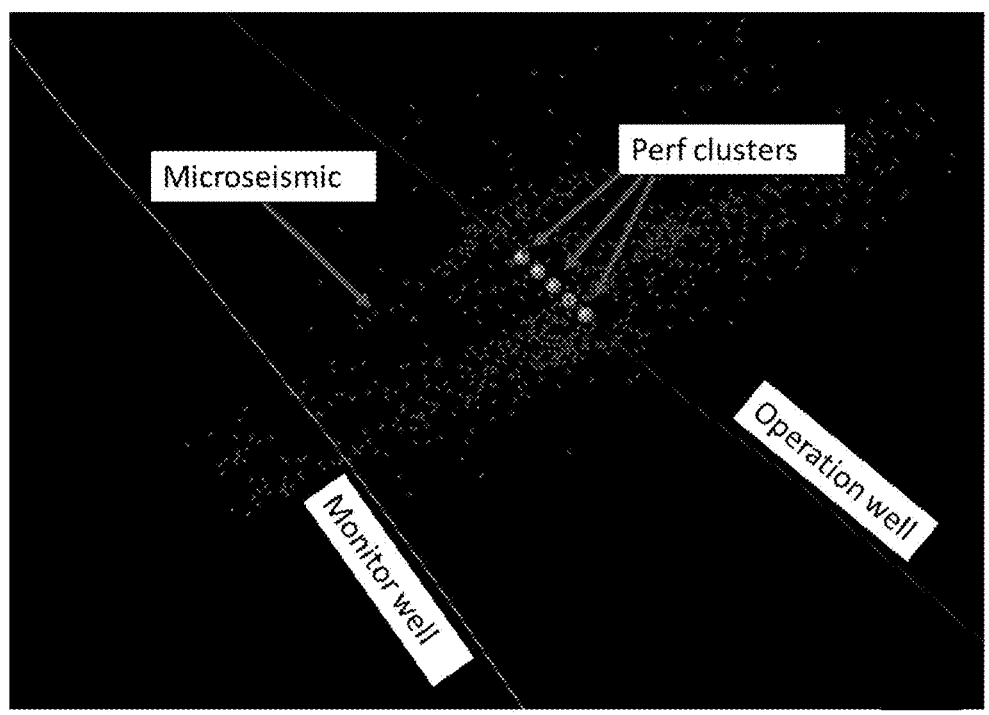
FIG. 2: Well geometry for the horizontal monitor well example. The operation well and monitor well are shown as blue and green lines, respectively. The two wells are about 700 ft away at this stage. Large solid dots (light green) indicate the perforation location, small dots show the microseismic events.

FIG. 2 shows an example of using an instrumented horizontal well to monitor hydraulic fractures. In this example, the monitor well is about 700 feet away from the operation well. The microseismic events show the fractures extended to the monitor well. The fiber in the monitor well is installed outside the casing and cemented in place. The DAS data are recorded continuously during the entire fracturing operation. At this stage, 5 perforation clusters were stimulated simultaneously.

Figure 3:
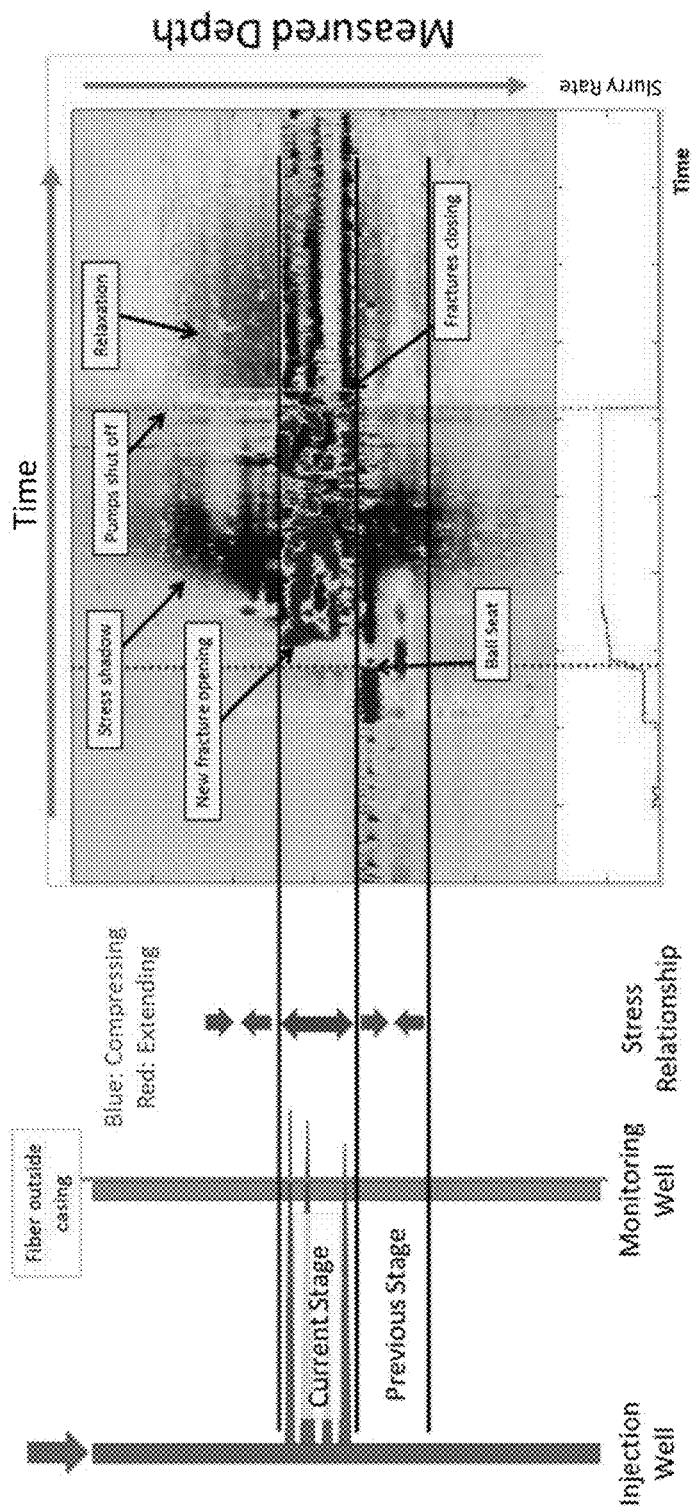
FIG. 3: Low-frequency DAS response at an offset well during hydraulic fracturing operation.

FIG. 3 shows the low-frequency DAS data during the hydraulic fracturing operation as recorded in the monitor well. In this figure, blue and red indicate the fiber compressing and extending, respectively. If a section of the fiber is in the path of a fracture, this part of the fiber will be extended. If the section is on either side of the opening fracture, then it will be compressed (also known as stress shadowing). Individual fracture hits can be identified at several separated fiber locations, where the fiber is extended during the pumping and compressed afterwards, corresponding to the opening and closing of fractures. The length of fiber on the monitor well that records the fracture-hits is comparable to the stage length in the operation well, indicating near-parallel growing fractures. However, deviations from near-parallel fracture patterns that could be related to geology or other factors have also been observed. The extension zone at the tip of the fractures can also be observed as a heart-shape extending pattern at the beginning of the fracture hit signal (marked as 'new fracture opening' in FIG. 3). Three fracture intersections can be easily recognized in this stage, with the minimal distance between the fracture hits close to the cluster spacing. Based on this observation, we conclude that 3 of 5 perforation clusters have created a fracture that propagates at least 700 feet horizontally. The velocity of each fracture's propagation can also be estimated by the delay time between the ball seat event in the operation well and the fracture hit arrived at the monitor well. It is also worth noting that due to the spatial resolution (1 m) of DAS, we are unable to distinguish whether each fracture hit represent a single fracture or multiple fractures. In this study, we assume that each individual fracture hit is created by a single fracture.

Figure 4:
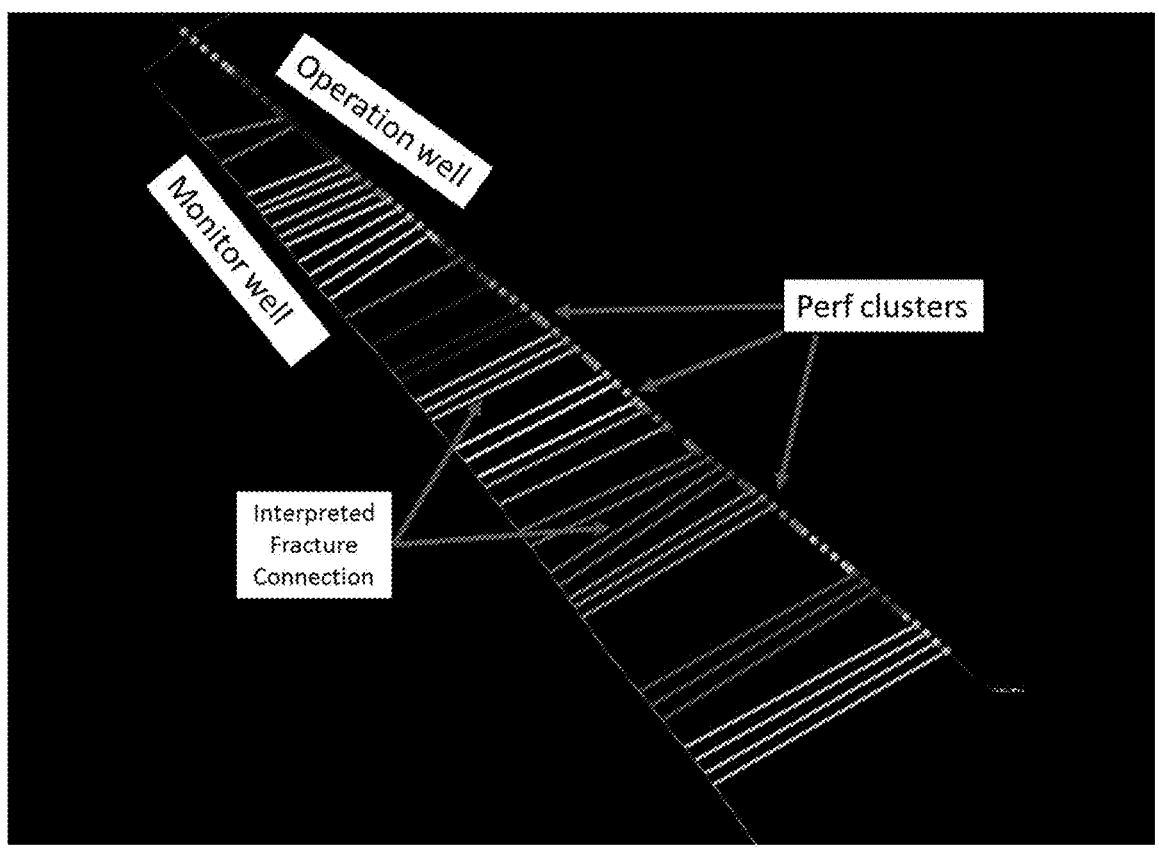
FIG. 4: Interpreted fracture connections between the operation well and monitor well. Solid dots are perforation clusters colored by stage. Thick solid lines are interpreted fracture connections from perf cluster to fracture hit, colored by stage as well. Thin lines are well paths.

After locating the fracture hits on the monitor well for all stages, a fracture connection map was created to illustrate the fracture network between the two wells (FIG. 4). Interpretation based on the local maximum stress direction and the fracture hit spacing is made to connect the fracture hits at the monitor well to the perforation clusters in the operation well. This fracture map provides constrain on fracture length, far-field fracture density, as well as cluster efficiency of the operation well.

After the injection stopped (shown by the pump curve in FIG. 3), the signal of extending in the DAS data at the fracture hit locations immediately changes to a signal of compressing, indicating that fractures start to close. The fracture closing signal can last for hours. In FIG. 3, fracture hits from previous stage are still visible before the pumping started at current stage. These previously created fractures opened again in the beginning of the injection. We interpret this to be an indication that the plug was not effective to create isolation between stages now. After the ball seated in the plug, the previous fractures quickly closed, while new fractures were created and started to open. This strain response at the monitor well can also be used to diagnose plug isolation in the operation well.

Stress Shadow

The stress shadow can be clearly identified as the growing compressing (blue) zones on both sides of the fracture zone during the injection in FIG. 3. The stress shadow effect can be observed to extend several stage lengths. As soon as injection stopped, the signal of compressing switched to one of extending, indicating the stress shadow started to relax immediately after the job.

Figure 5A:
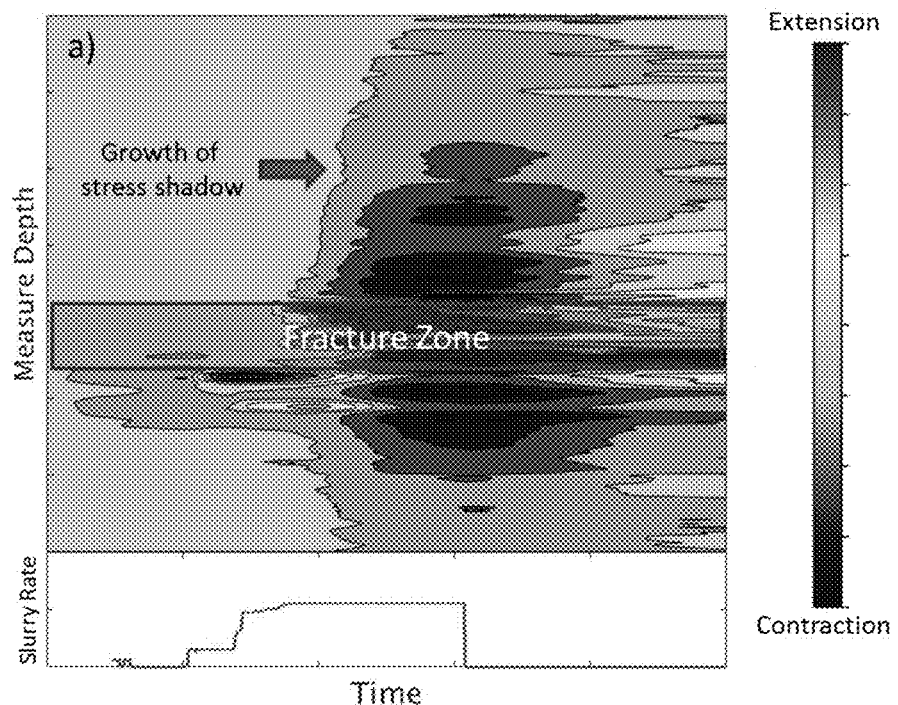
FIG. 5A) data in FIG. 3 is integrated in time to obtain accumulative strain variation. The color contour indicates compression and extension compared to time 0.

Another way to utilize the stress shadow signal is to integrate the DAS strain rate measurement to produce strain. FIG. 5a shows the integration of the data from FIG. 3 in time. As more fluid is injected, the size and magnitude of the stress shadow increases. By knowing the gauge length, laser frequency, and photoelastic coefficient of the fiber, we can convert the DAS measured optical phase into strain. With the elastic properties of the formation rock, the strain measurement can be compared with local structural stress field to evaluate the stress shadow effect on fracture propagation. In this example, the data also indicates that after the injection stopped, the stress shadow is relaxed in a fairly short period of time.

Figure 5B:
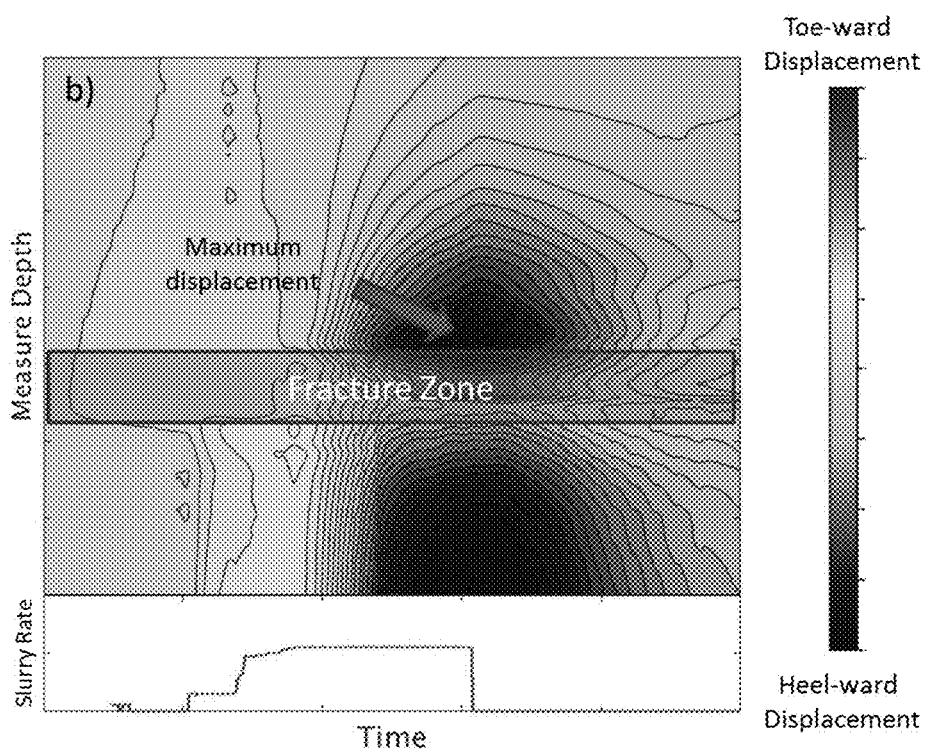
FIG. 5B) data in a) is integrated in depth to obtain the displacement. The lower panels show the injection rate.

The strain measurement can be further integrated in space to get displacement, as shown in FIG. 5b. This attribute estimates the amount of displacement that the formation must deform to create the space for the opening fractures, which is an indirect estimation of the fracture width. In FIG. 5b, the displacement is integrated from heel to toe, and maximizes just above the fracture zone before the injection stopped. If the formation and the fiber are well-coupled, the displacement should become positive (toe-wards) after the fracture zone and eventually gets back to zero towards the toe. However, we observed an increase of heel-wards displacement at the toe. This non-physical observation is due to the mechanical decoupling between the fiber and formation in the fracture zone, which is expected because the fiber was not broken while the formation was fractured.

The extension strain measured by the fiber in the fracture zone should be much smaller than the actual strain happened inside and near the fractures. The hypothesis for that argument is that the mechanical decoupling is likely to happen between the formation rock and the cement in a form of slipping movement. Another cautionary note for using the strain and displacement estimation from DAS quantitatively is the mechanical coupling condition within the fiber cable. For better protection, optical fiber installed in borehole condition is usually surrounded by a layer of viscous gel, which decouple the fiber with outside casing mechanically. Although we still can observe the clear formation strain variation in the data, the signal magnitude may be significantly dampened due to the gel layer. Further laboratory investigation is required to calibrate this effect.

It is also important to mention that the DAS monitor well strain measurement in horizontal well should be acquired before the monitor well is hydraulically fractured. Once the well is completed and the borehole is opened to the formation, strain perturbation from other well's operation can produce cross flows between the perforation clusters of the monitor well, which generates large temperature variations and contaminates the strain signal required for fracture mapping.

Vertical Well Measurement

Figure 6:
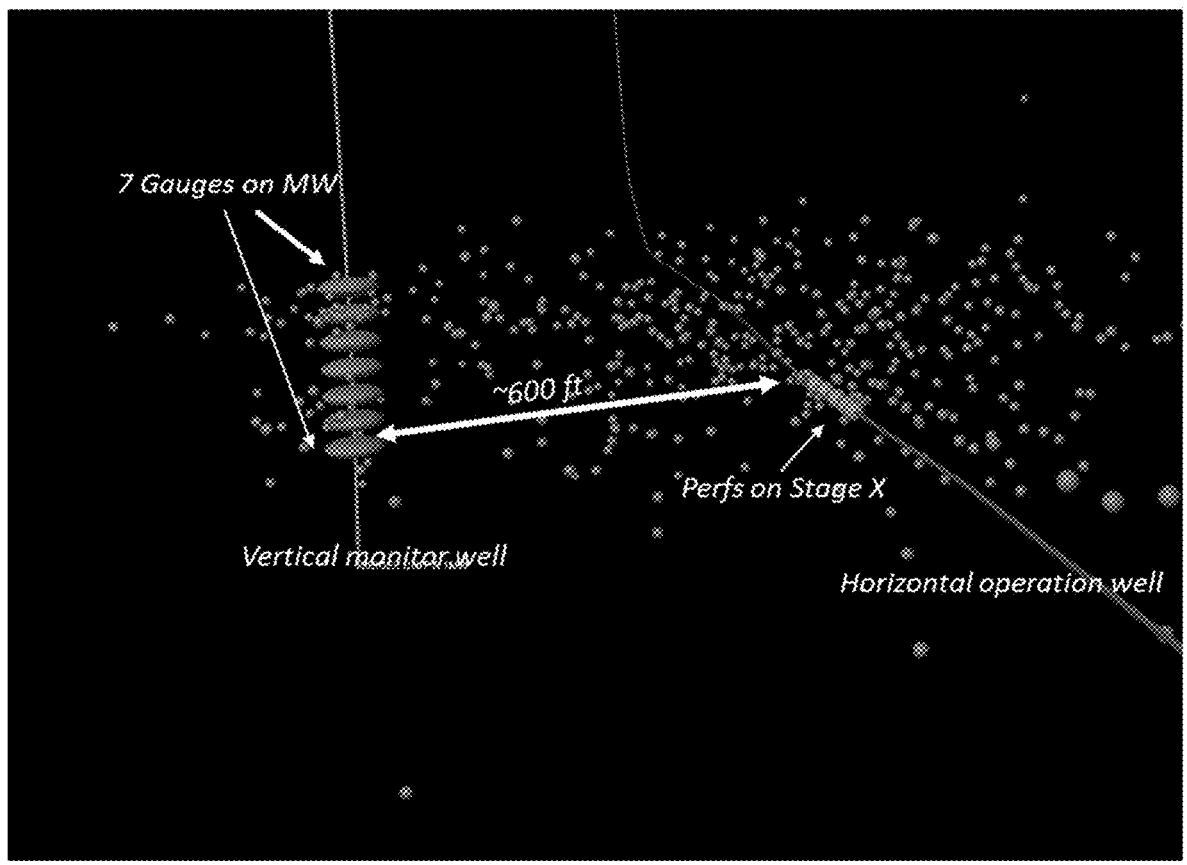
FIG. 6: Well geometries for the vertical monitor well example. The blue and green lines are vertical monitor well and horizontal operation well, respectively. Large green dots are perforation clusters of the stage, brown dots are microseismic events. The large blue disks are co-located pressure and temperature gauge pairs.

Fiber can also be installed in a vertical monitor well to observe the vertical extent of hydraulic fracture hits from the stimulation well. FIG. 6 shows an example, where the instrumented vertical well is about 600 ft away from the operation well. The microseismic events indicates the hydraulic fractures have reached the monitor well. Seven pairs of temperature and pressure gauges in the monitor well are shown as blue disks. However, only three pressure gauges were functioning during the operation. The fiber in this case is also cemented in place to be mechanically coupled with the formation.

Figure 7:
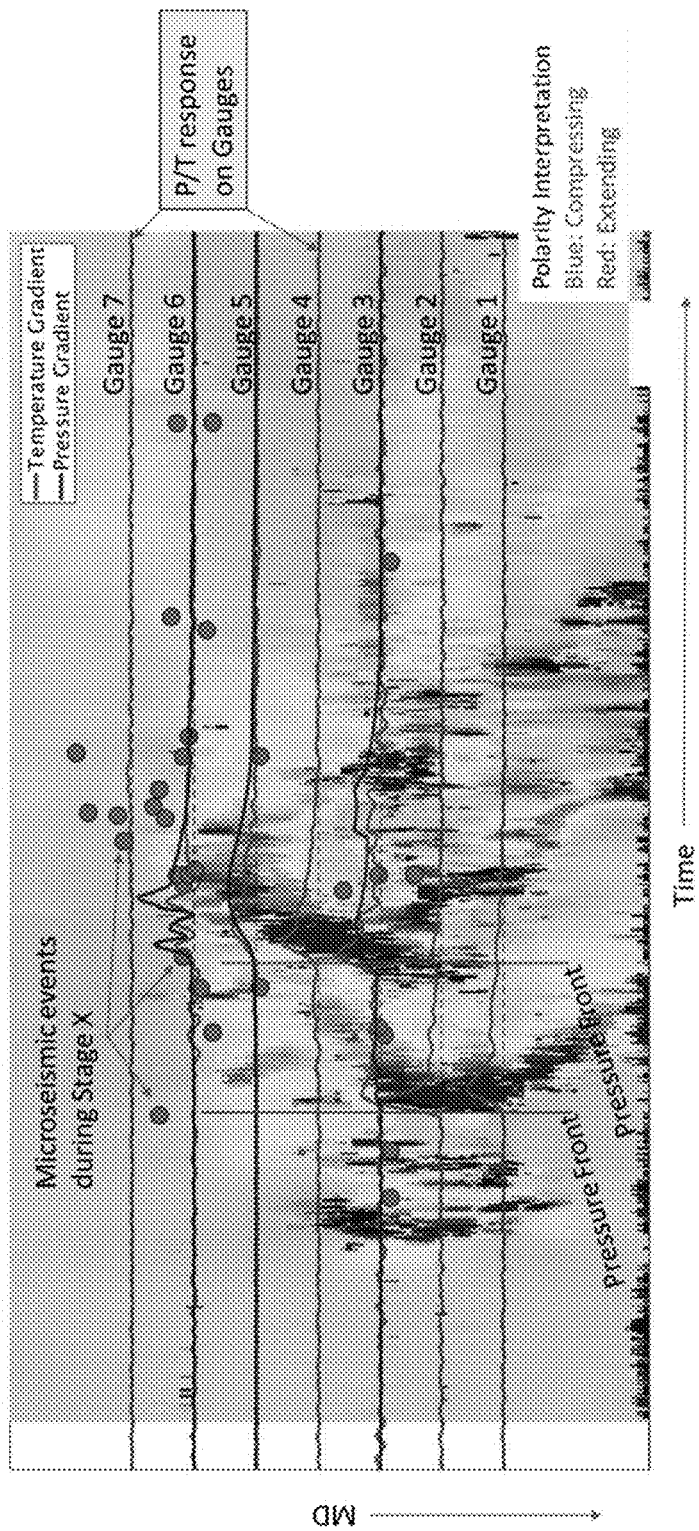
FIG. 7: Low-frequency DAS response (color plot) co-plotted with temperature and pressure differential measured by gauges at the vertical well. Red and blue curves are temperature and pressure differential, respectively. Dashed gray lines indicate the gauge pair locations. Solid purple dots are microseismic events that are less than 100 feet away from the monitor well.

The low-frequency DAS response together with pressure and temperature gauge data are plotted in FIG. 7. The gauge data are differentiated in time to match the DAS strain rate measurement. The gauge response is plotted at their measured depths and scaled for better visualization. Microseismic events with distance less than 100 feet from the monitor well are plotted based on their time and location.

Two separate fracture hit events can be clearly identified in the data, which are associated with fiber extending, and increased temperature and pressure differential. The DAS response is highly correlated with the temperature gauge response. The hyperbolic arrival-time curves that relate to the fracture propagation can also be observed in the DAS data due to the high spatial resolution and large coverage. The shape of the fracture signal arrival curves can be used to estimate the fracture propagation velocity near the monitor well, while the delay time from the ball seat event to the fracture hit arrival can be used to estimate the average fracture propagation velocity between the wells. The first DAS responses are consistent with the first recorded local microseisms in time and depth. However, the DAS data indicate a deeper fracture growth compared to the microseismic observations. It is also ambiguous to interpret the two fracture hits as two sections of one fracture plane, or two individual fractures, as the dipping angle of the fractures is not well constrained in this case.

Figure 8A:
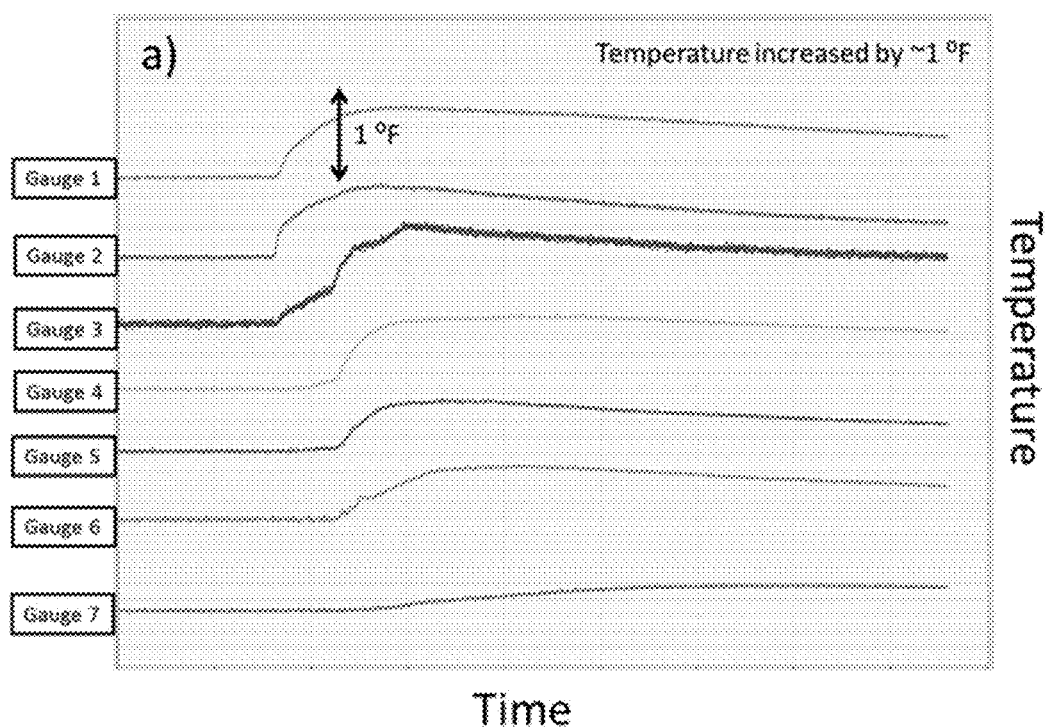
FIG. 8A: Temperature gauge response during a fracture hit from FIG. 7.
Figure 8B:
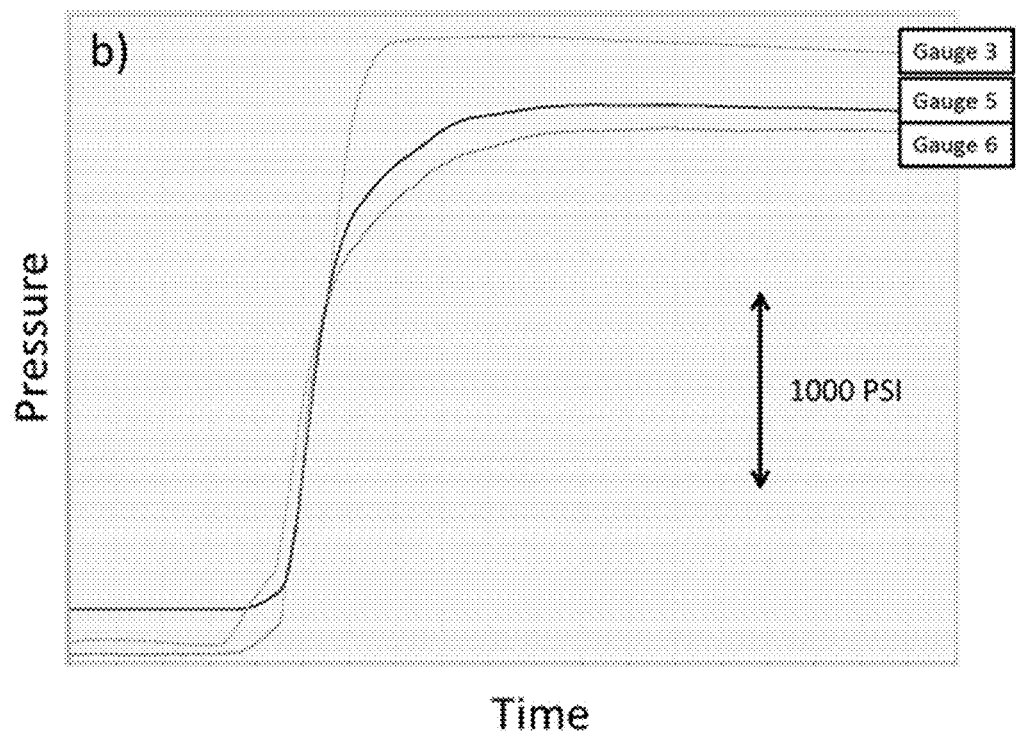
FIG. 8B: Pressure gauge response during a fracture hit from FIG. 7.

Because the fiber in the vertical well is almost parallel to the fracture plane, it cannot detect the extension strain created by the fracture opening. Due to the high correlation with the co-located temperature gauge data, we believe that the DAS response in this example is caused by the thermal expansion of the fiber due to temperature change. Although the injected fluid is much cooler than the reservoir temperature, temperature increases are observed at all gauges. We interpret this warming event as the adiabatic compression heating of formation fluid. As shown in FIG. 8, the absolute temperature is increased by about 1° F., while the pressure is increased by about 3000 PSI. This ratio is consistent with the adiabatic compression heating coefficient of water under the reservoir pressure (Knoerzer et al. 2010), which predicts a 1.5° F. temperature increase.

CONCLUSIONS

DAS signal in the low-frequency band (<0.05 Hz) can be used to measure small and gradual strain variation along the fiber. The strain variation can be caused mechanically and/or thermally. Fibers in the horizontal well can be used to monitor the strain perturbation due to fracture propagation during hydraulic stimulation. Fracture intersections with the monitor well can be precisely located, and magnitude of stress shadow can be quantitatively measured. The low-frequency DAS data in this case can be used to constrain the fracture length, density, and width. If the fiber is installed in the vertical well that is parallel to the fracture plane, it can be used to detect the small temperature perturbation due to the increased pressure in the fractures, which can be used to constrain the fracture vertical height. The low-frequency band of DAS data contain valuable information and should be carefully preserved in data processing and hardware development. Hydraulic fracture geometry characterizations using this method can be used to evaluate completions and well spacing design, and constrain reservoir models.

The following references are incorporated by reference in their entirety for all purposes.
1. U.S. Ser. No. 10/095,828, Swan, et al., "Production Logs from Distributed Acoustic Sensors," (2018)
2. US-2014-0358444, Friehauf & Dean, "Method of Hydraulic Fracture Identification Using Temperature," (2014)
3. US-2017-0260839, Beardmore, et al., "DAS for Well Ranging," (2017)
4. U.S. Pat. No. 10,458,228, Jin, et al., "Low Frequency Distributed Acoustic Sensing," (2017)
5. U.S. Pat. No. 10,370,957, Jin, et al., "Measuring Downhole Temperature by Combining DAS/DTS Data," (2017)
6. U.S. Pat. No. 10,465,501, Friehauf & Gibson, "DAS Method of Estimating Fluid Distribution," (2017)
7. U.S. Pat. No. 10,287,874, Jin, et al., "Hydraulic Fracture Monitoring by Low-Frequency DAS," (2017)
8. U.S. Pat. No. 10,890,058, Krueger, et al., "Low-Frequency DAS SNR Improvement," (2017)
9. U.S. Pat. No. 10,808,521, Friehauf, "Hydraulic Fracture Analysis," (2018)
10. Kulander, B. R., Dean, S. L., and Ward B. J. 1990. *Fractured Core Analysis: Interpretation, Logging, and Use of Natural and Induced Fractures in Core*, AAPG Methods in Exploration Series, No 8. Tulsa, 1990
11. Kevin T. Raterman, et al. *Sampling a Stimulated Rock Volume: An Eagle Ford Example*, Unconventional Resources Technology Conference (URTeC), 2017, URTeC: 2670034.
12. Fisher, M. K., J. R. Heinze, C. D. Harris, B. M. Davidson, C. A. Wright, and K. P. Dunn. 2004. "Optimizing Horizontal Completion Techniques in the Barnett Shale Using Microseismic Fracture Mapping". In *SPE Annual Technical Conference and Exhibition*. Society of Petroleum Engineers. doi:10.2118/90051-ms.
13. Haustveit, K., K. Dahlgren, H. Greenwood, T. Peryam, B. Kennedy, and M. Dawson. 2017. "New Age Fracture Mapping Diagnostic Tools-A STACK Case Study". In *SPE Hydraulic Fracturing Technology Conference and Exhibition*. Society of Petroleum Engineers. doi:10.2118/184862-ms.
14. Atkinson, Jared, and Thomas Davis. 2011. "Multicomponent Time-Lapse Monitoring of Two Hydraulic Fracture Stimulations in an Unconventional Reservoir Pouce Coupe Field, Canada". In *SEG Technical Program Expanded Abstracts* 2011. Society of Exploration Geophysicists. doi:10.1190/1.3628062.
15. Dawson, Matthew, and Gunther Kampfer. 2016. "Breakthrough in Hydraulic Fracture & Proppant Mapping: Achieving Increased Precision with Lower Cost". In *Proceedings of the 4th Unconventional Resources Technology Conference*. American Association of Petroleum Geologists. doi:10.15530/urtec-2016-2432330.
16. Boone, K., R. Crickmore, Z. Werdeg, C. Laing, and M. Molenaar. 2015. "Monitoring Hydraulic Fracturing Operations Using Fiber-Optic Distributed Acoustic Sensing". In *Unconventional Resources Technology Conference*. Society of Petroleum Engineers (SPE). doi:10.2118/178648-ms.
17. Webster, Paul, Barbara Cox, and Mathieu Molenaar. 2013. "Developments in Diagnostic Tools for Hydraulic Fracture Geometry Analysis". In *Unconventional Resources Technology Conference Denver, Colorado, 12-14 Aug.* 2013. Society of Exploration Geophysicists. doi:10.1190/urtec2013-025.
18. Webster, P., J. Wall, C. Perkins, and M. Molenaar. 2013. "Micro-Seismic Detection Using Distributed Acoustic Sensing". In *SEG Technical Program Expanded Abstracts* 2013. Society of Exploration Geophysicists. doi:10.1190/segam2013-0182.1.
19. Grechka, V. 2005. "Penny-Shaped Fractures Revisited". *Studia Geophysica Et Geodaetica* 49 (3). Springer Nature: 365-81. doi:10.1007/s11200-005-0015-3.
20. Knoerzer, Kai, Roman Buckow, Peerasak Sanguansri, and Cornelis Versteeg. 2010. "Adiabatic Compression Heating Coefficients for High-Pressure Processing of Water Propylene-Glycol and Mixtures A Combined Experimental and Numerical Approach". *Journal of Food Engineering* 96 (2). Elsevier BV: 229-38. doi:10.1016/j.jfoodeng.2009.07.017.

The invention claimed is:

1. A method of developing a hydrocarbon reservoir comprising:
   a) providing a hydrocarbon reservoir comprising at least one operation well, at least one horizontal monitor well, and at least one vertical monitor well,
   wherein at least one horizontal monitor well comprises a distributed acoustic sensing (DAS) fiber, and at least one vertical monitor well comprises a DAS fiber;
   b) monitoring a DAS signal while fracturing said operation well in a fracture stimulation to form a set of fractures;
   c) processing the DAS signal to model fracture properties in the hydrocarbon reservoir
   wherein the DAS signal is down-sampled to 1 s after a low-pass anti-aliasing filter (0-0.5 Hz) to obtain Low-Frequency DAS data;
   d) determining the length, density, width, and height of said fractures; and
   e) improving stimulated reservoir volume in said hydrocarbon reservoir.

2. The method of claim 1, wherein said DAS fiber is a permanently installed DAS fiber or a temporary drop-in DAS fiber.

3. The method of claim 1, wherein said monitor well collects data from one or more adjacent operation wells.

4. The method of claim 1, wherein said characterizing step includes modeling the stress shadow, displacement, fracture propagation velocity, or a combination thereof.

5. The method of claim 1, further comprising repeating the method for multiple fractures in said hydrocarbon reservoir.

6. The method of claim 1, further comprising repeating the method for multiple horizontal operation wells, wherein one or more horizontal operation wells are used as horizontal monitor wells for adjacent operation wells.

7. A method of improving stimulated reservoir volume in a hydrocarbon reservoir comprising:
   a) providing a hydrocarbon reservoir comprising at least one operation well, at least one horizontal monitor well, and at least one vertical monitor well,
   wherein at least one horizontal monitor well comprises a distributed acoustic sensing (DAS) fiber, and at least one vertical monitor well comprises a DAS fiber;
   b) monitoring a DAS signal while fracturing said operation well in a fracture stimulation with pre-determined fracturing parameters to form a set of fractures;
   c) processing the DAS signal to model fracture properties in the hydrocarbon reservoir
   wherein the DAS signal is down-sampled to 1 s after a low-pass anti-aliasing filter (0-0.5 Hz) to obtain Low-Frequency DAS data;
   d) characterizing the length, density, width, and height of said fractures;

e) updating said pre-determined fracturing parameters based on said characterizing step;
f) performing a second fracturing stimulation stage; and,
g) producing hydrocarbons.

8. The method of claim 7, wherein said DAS fiber is a permanently installed DAS fiber or a temporary drop-in DAS fiber.

9. The method of claim 7, wherein said monitor well collects data from one or more adjacent operation wells.

10. The method of claim 7, wherein said characterizing step includes modeling the stress shadow, displacement, fracture propagation velocity, or a combination thereof.

11. The method of claim 7, further comprising repeating the method for multiple fractures in said hydrocarbon reservoir.

12. The method of claim 7, further comprising repeating the method for multiple horizontal operation wells, wherein one or more horizontal operation wells are used as horizontal monitor wells for adjacent horizontal operation wells.

13. A computer-implemented method for modeling the stimulated reservoir volume (SRV) of a hydrocarbon reservoir, the method comprising:
a) providing a hydrocarbon reservoir comprising at least one operation well, at least one horizontal monitor well, and at least one vertical monitor well,
b) wherein at least one horizontal monitor well comprises a distributed acoustic sensing (DAS) fiber, and at least one vertical monitor well comprises a DAS fiber;
c) monitoring a DAS signal while fracturing said operation well in a fracture stimulation with pre-determined fracturing parameters to form a set of fractures;
d) processing the DAS signal to model fracture properties in the hydrocarbon reservoir
wherein the DAS signal is down-sampled to 1 s after a low-pass anti-aliasing filter (0-0.5 Hz) to obtain Low-Frequency DAS data;
e) identifying said set of fractures formed in said fracturing step; and,
f) characterizing the length, density, width, or height of said fractures.

14. The method of claim 11, wherein said DAS fiber is a permanently installed DAS fiber or a temporary drop-in DAS fiber.

15. The method of claim 11, wherein said monitor well collects data from one or more adjacent operation wells.

16. The method of claim 11, wherein said characterizing step includes modeling the stress shadow, displacement, fracture propagation velocity, or a combination thereof.

17. The method of claim 11, further comprising repeating the method for multiple fractures in said hydrocarbon reservoir.

18. The method of claim 11, further comprising repeating the method for multiple horizontal operation wells, wherein one or more horizontal operation wells are used as horizontal monitor wells for adjacent operation wells.

* * * * *